US011745693B2

United States Patent
Ohno et al.

(10) Patent No.: US 11,745,693 B2
(45) Date of Patent: Sep. 5, 2023

(54) SEAT-MOUNTED AIRBAG DEVICE

(71) Applicant: TOYOTA JIDOSHA KABUSHIKI KAISHA, Toyota (JP)

(72) Inventors: Mitsuyoshi Ohno, Miyoshi (JP); Jiro Ohachi, Sunto-gun Shizuoka-ken (JP); Masashi Hotta, Hashima-gun Gifu-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/706,032

(22) Filed: Mar. 28, 2022

(65) Prior Publication Data

US 2022/0396233 A1 Dec. 15, 2022

(30) Foreign Application Priority Data

Jun. 9, 2021 (JP) .................................. 2021-096913

(51) Int. Cl.
*B60R 21/2338* (2011.01)
*B60R 21/207* (2006.01)
(Continued)

(52) U.S. Cl.
CPC ........ *B60R 21/2338* (2013.01); *B60R 21/207* (2013.01); *B60R 21/231* (2013.01);
(Continued)

(58) Field of Classification Search
CPC .............. B60R 21/2338; B60R 21/207; B60R 21/23138; B60R 21/231; B60R 21/237;
(Continued)

(56) References Cited

U.S. PATENT DOCUMENTS 6,120,099 A * 9/2000 Reikerå .................. B60N 2/868
297/391
7,549,672 B2 6/2009 Sato et al.
(Continued)

FOREIGN PATENT DOCUMENTS

CN 102582565 A * 7/2012
DE 102014201474 A1 * 7/2015 ........... B60R 21/207
(Continued)

OTHER PUBLICATIONS

Non-Final Office Action dated Jan. 31, 2023 to U.S. Appl. No. 17/950,633, filed Sep. 22, 2022.
(Continued)

*Primary Examiner* — Keith J Frisby
(74) *Attorney, Agent, or Firm* — Dinsmore & Shohl LLP

(57) ABSTRACT

A seat-mounted airbag device includes an inflator that is operated when a vehicle collision is detected or predicted and ejects gas and an airbag body that includes a front-rear chamber and a tip chamber. The front-rear chamber is deployed forward of a seat through a clearance between a window and a head of an occupant from a side portion of a headrest on a window side by the gas ejected from the inflator and disposed between the window and the head of the occupant. The tip chamber is deployed inward in a seat width direction from an end portion of the front-rear chamber on a seat front side and disposed forward of a face of the occupant on the seat front side. The airbag body housed in the side portion includes an outward wound portion wound outward in a roll shape with a seat up-down direction as an axial direction.

4 Claims, 7 Drawing Sheets

(51) Int. Cl.
  *B60R 21/231* (2011.01)
  *B60R 21/237* (2006.01)
  *B60R 21/01* (2006.01)
  *B60R 21/00* (2006.01)

(52) U.S. Cl.
  CPC .... *B60R 21/237* (2013.01); *B60R 2021/0048* (2013.01); *B60R 2021/01013* (2013.01); *B60R 2021/2074* (2013.01); *B60R 2021/23146* (2013.01); *B60R 2021/23386* (2013.01)

(58) Field of Classification Search
  CPC ........ B60R 21/2334; B60R 2021/2074; B60R 2021/23386; B60R 2021/0048; B60R 2021/23146; B60R 2021/23161; B60R 2021/161; B60N 2/888; B60N 2/885
  USPC ...... 280/730.1, 730.2, 743.1, 743.2; 297/391
  See application file for complete search history.

(56) References Cited

U.S. PATENT DOCUMENTS

| | | | |
|---|---|---|---|
| 8,485,553 B1 * | 7/2013 | Kuhne | B60R 21/205 |
| | | | 280/743.2 |
| 8,985,622 B1 * | 3/2015 | Cannon | B60R 21/231 |
| | | | 280/730.2 |
| 9,994,181 B1 | 6/2018 | Dubaisi et al. | |
| 10,336,283 B2 | 7/2019 | Rickenbach et al. | |
| 10,543,801 B2 | 1/2020 | Kwon | |
| 10,710,539 B2 | 7/2020 | Cho et al. | |
| 10,870,405 B2 | 12/2020 | Kwon | |
| 11,390,235 B2 | 7/2022 | Kim | |
| 2006/0131847 A1 | 6/2006 | Sato et al. | |
| 2012/0242067 A1 * | 9/2012 | Kino | B60R 21/231 |
| | | | 493/405 |
| 2013/0234421 A1 * | 9/2013 | Honda | B60R 21/23138 |
| | | | 280/730.2 |
| 2014/0284907 A1 | 9/2014 | Akiyama | |
| 2016/0082915 A1 * | 3/2016 | Madaras | B60R 21/013 |
| | | | 297/216.19 |
| 2018/0236962 A1 * | 8/2018 | Ohno | B60R 21/207 |
| 2019/0161053 A1 | 5/2019 | Gwon et al. | |
| 2019/0176739 A1 * | 6/2019 | Song | B60R 21/207 |
| 2019/0225184 A1 * | 7/2019 | Ohno | B60R 21/23138 |
| 2021/0138989 A1 | 5/2021 | Markusic et al. | |
| 2022/0355758 A1 * | 11/2022 | Freisler | B60R 21/207 |
| 2022/0388472 A1 | 12/2022 | Hwangbo et al. | |
| 2022/0396231 A1 | 12/2022 | Ohno et al. | |
| 2023/0010582 A1 | 1/2023 | Ohachi et al. | |
| 2023/0064279 A1 | 3/2023 | Ohno et al. | |

FOREIGN PATENT DOCUMENTS

| | | | | |
|---|---|---|---|---|
| DE | 102018104392 A1 | | 8/2019 | |
| DE | 102019103484 A1 | | 8/2019 | |
| DE | 102020109466 A1 | | 4/2021 | |
| DE | 102020118337 A1 | | 1/2022 | |
| DE | 102020118339 A1 | | 1/2022 | |
| DE | 102020123629 A1 | | 3/2022 | |
| JP | 2000062562 A | | 2/2000 | |
| JP | 2002211338 A | | 7/2002 | |
| JP | 2006-008105 A | | 1/2006 | |
| JP | 2007191077 A | | 8/2007 | |
| JP | 2010-076640 A | | 4/2010 | |
| JP | 2013018378 A | * | 1/2013 | |
| JP | 2014184805 A | | 10/2014 | |
| JP | 2019511414 A | | 4/2019 | |
| JP | 2019127101 A | | 8/2019 | |
| JP | 2019-218013 A | | 12/2019 | |
| JP | 2021049898 A | | 4/2021 | |
| KR | 20080003201 A | * | 1/2008 | |
| KR | 10-20200075065 A | | 6/2020 | |
| WO | 2016174785 A1 | | 11/2016 | |
| WO | WO-2017099398 A1 | * | 6/2017 | ............. B60R 21/16 |
| WO | 2019121222 A1 | | 6/2019 | |
| WO | 2019/166268 A1 | | 9/2019 | |
| WO | WO-2021121737 A1 | * | 6/2021 | ....... B60R 21/23138 |
| WO | 2022053331 A1 | | 3/2022 | |

OTHER PUBLICATIONS

Non-Final Office Action dated Mar. 2, 2023 to U.S. Appl. No. 17/886,098, filed Aug. 11, 2022.
Non-Final Office Action dated Feb. 7, 2023 to U.S. Appl. No. 17/712,703, filed Apr. 4, 2022.
Office Action dated Feb. 7, 2023 to U.S. Appl. No. 17/728,446, filed Apr. 25, 2022.
Notice of Allowance dated Apr. 14, 2023, Issued to U.S. Appl. No. 17/712,703, filed Apr. 4, 2022.
Notice of Allowance dated Apr. 17, 2023, Issued to U.S. Appl. No. 17/728,446, filed Apr. 25, 2022.
Notice of Allowance dated May 16, 2023, Issued to U.S. Appl. No. 17/886,098, filed Aug. 11, 2022.
Notice of Allowance dated Jun. 16, 2023, Issued to U.S. Appl. No. 17/886,098, filed Aug. 11, 2022.

* cited by examiner

SEAT-MOUNTED AIRBAG DEVICE

CROSS-REFERENCE TO RELATED APPLICATION

This application claims priority to Japanese Patent Application No. 2021-096913 filed on Jun. 9, 2021, incorporated herein by reference in its entirety.

BACKGROUND

1. Technical Field

The present disclosure relates to a seat-mounted airbag device.

2. Description of Related Art

A side airbag device has been known in which the side airbag device includes an airbag body portion that is deployed forward from one side of a seat back and that is disposed on the upper body (including the head) side of an occupant and an airbag protruding portion that is deployed inward in a seat width direction from the airbag body portion and that is disposed forward of the face of the occupant in the event of a frontal collision of a vehicle (see, for example, Japanese Unexamined Patent Application Publication No. 2006-008105 (JP 2006-008105 A)).

SUMMARY

However, when the airbag device is mounted on the side of the seat back facing a window side and the head of the occupant is closer to the window side during a frontal collision of the vehicle, a clearance between the window and the head of the occupant becomes narrow and it becomes difficult for an airbag to be deployed, which may cause delay in deployment of the airbag. As described above, there is room for improvement in the airbag device in which the airbag is deployed through the clearance between the window and the head of the occupant.

Therefore, the present disclosure provides a seat-mounted airbag device in which the airbag body is smoothly deployed even when the clearance between the window and the head of the occupant is narrow.

A seat-mounted airbag device according to an aspect of the present disclosure includes an inflator that is operated when a vehicle collision is detected or predicted and ejects gas, and an airbag body that is deployed forward of a seat through a clearance between a window and a head of an occupant from a side portion of a headrest on a window side by the gas ejected from the inflator. The airbag body includes a front-rear chamber that is disposed between the window and the head of the occupant, and a tip chamber that is deployed inward in a seat width direction from an end portion of the front-rear chamber on a seat front side and disposed forward of a face of the occupant on the seat front side. The airbag body housed in the side portion includes an outward wound portion wound outward in a roll shape with a seat up-down direction as an axial direction.

According to the aspect of the disclosure, the airbag body housed in the side portion of the headrest on the window side includes the outward wound portion wound outward in a roll shape with the seat up-down direction as the axial direction. Therefore, when the airbag body is deployed forward of the seat through the clearance between the window and the head of the occupant from the side portion of the headrest on the window side by the gas ejected from the inflator, the outward wound portion wound outward in a roll shape is deployed while being unwound. Therefore, even when the head of the occupant is closer to the window side and the clearance between the window and head of the occupant is narrow, the airbag body is easily deployed along the window and is smoothly deployed.

In the seat-mounted airbag device according to the aspect, the airbag body housed in the side portion may include a bellows portion continuously folded in a bellows shape on an upstream side with respect to the outward wound portion in a deployment direction.

According to the aspect, the airbag body may include the bellows portion continuously folded in a bellows shape on the upstream side with respect to the outward wound portion in the deployment direction. Therefore, when the airbag body is deployed forward of the seat through the clearance between the window and the head of the occupant from the side portion of the headrest on the window side by the gas ejected from the inflator, the bellows portion is first deployed while being unwound, and then the outward wound portion is deployed while being unwound. Here, it is generally known that the airbag body in a bellows shape can be unwound more quickly than the airbag body in a roll shape. Therefore, the airbag body including the bellows portion and the outward wound portion is deployed more quickly than when the airbag body includes only the outward wound portion.

Further, in the seat-mounted airbag device according to the aspect, in the airbag body housed in the side portion, the outward wound portion may be provided after an upper portion of the airbag body is folded downward.

According to the aspect, the airbag body is wound outward in a roll shape (the outward wound portion is provided) after the upper portion of the airbag body is folded downward. Therefore, when the airbag body is deployed forward of the seat through the clearance between the window and the head of the occupant from the side portion of the headrest on the window side by the gas ejected from the inflator, the outward wound portion wound outward in a roll shape is first deployed while being unwound, and then the upper portion of the airbag body is deployed upward. Therefore, the airbag body wound outward in a roll shape after the upper portion of the airbag body is folded downward is deployed more quickly than the airbag body of which the upper portion is folded downward after the airbag body is wound outward in a roll shape.

Further, in the seat-mounted airbag device according to the aspect, in the airbag body housed in the side portion, an upper portion of the airbag body may be folded downward after the outward wound portion is provided.

According to the aspect, the upper portion of the airbag body may be folded downward after the airbag body is wound outward in a roll shape (the outward wound portion is provided). Therefore, when the airbag body is deployed forward of the seat through the clearance between the window and the head of the occupant from the side portion of the headrest on the window side by the gas ejected from the inflator, the upper portion of the airbag body is first deployed upward, and then the outward wound portion wound outward in a roll shape is deployed while being unwound. Therefore, the airbag body easily pass through the narrow clearance between the window and the head of the occupant as compared with a case of the airbag body wound outward in a roll shape after the upper portion of the airbag body is folded downward.

As described above, according to the present disclosure, the airbag body can be smoothly deployed even when the clearance between the window and the head of the occupant is narrow.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
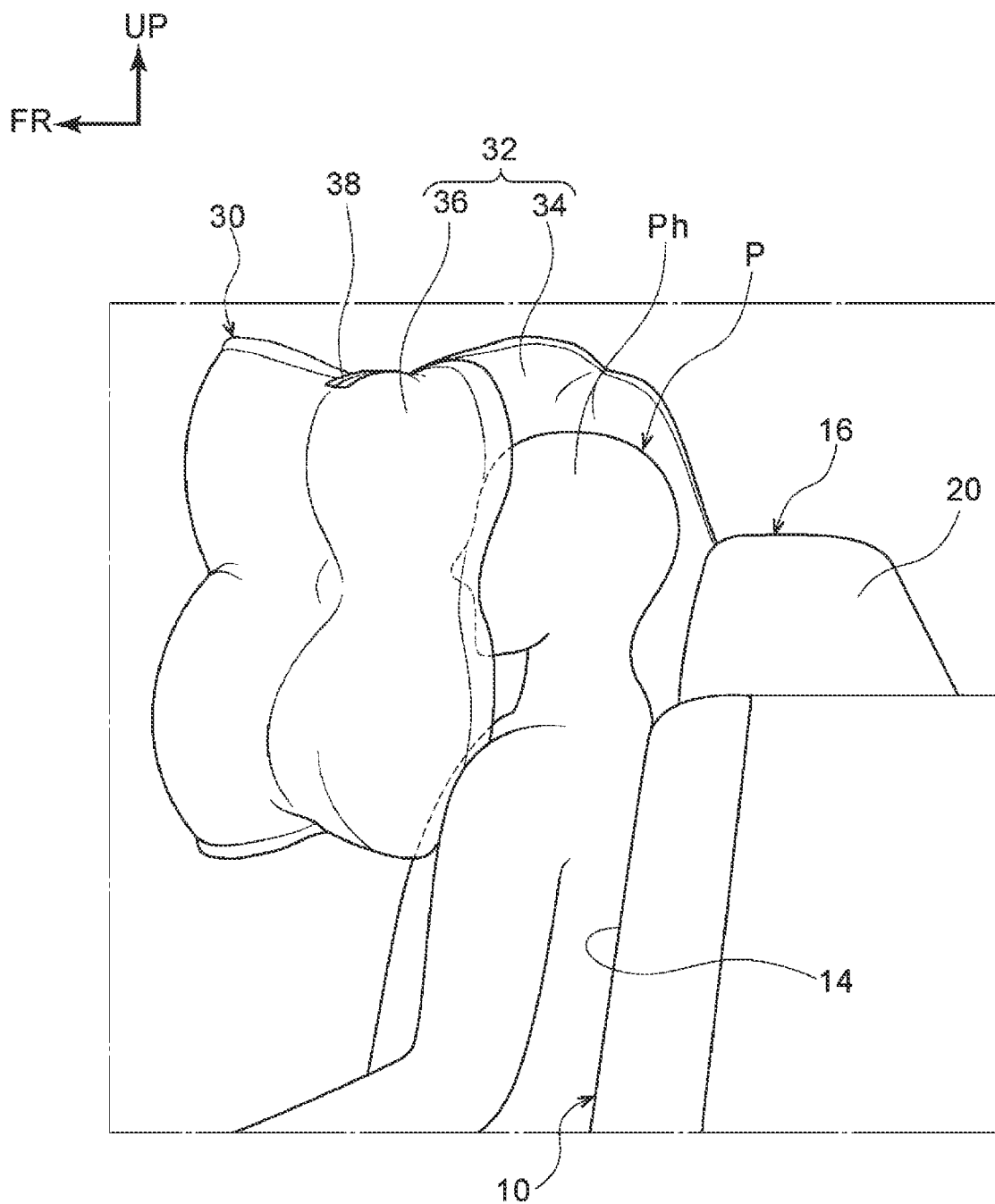
FIG. 1 is a side view showing a seat-mounted airbag device according to the present embodiment in a deployed state.

Hereinafter, embodiments according to the present disclosure will be described in detail with reference to the drawings. For convenience of description, the arrow UP, the arrow FR, and the arrow RH appropriately shown in the figures indicate the upward direction of a seat, the forward direction of the seat, and the right direction of the seat, respectively. Thus, when terms indicating directions, i.e., upward and downward, forward and rearward, and right and left are used in the following description without any specification, these mean upward and downward of the vehicle seat, forward and rearward of the vehicle seat, and right and left of the vehicle seat. Further, the right-left direction is synonymous with a seat width direction.

Further, a seat-mounted airbag device (hereinafter, simply referred to as an "airbag device") 30 according to the present embodiment is provided inside a case portion 20 (to be described below) constituting a headrest 16 of a vehicle seat 10 as a rear seat of a vehicle. Therefore, although the vehicle seat 10 according to the present embodiment is described as a rear seat, the airbag device 30 may be provided in a front seat.

Further, as will be described below, the airbag device 30 is deployed forward through the clearance between the side window 18 as a window and a head Ph of an occupant P (along a side window 18). Therefore, this airbag device 30 is applied to a vehicle that does not include a curtain airbag device, and a front-rear chamber 34 to be described below functions as a curtain airbag.

Further, the "window" in the present embodiment includes a state in which the side window 18 is open as well as a state in which the side window 18 is closed. Further, the "occupant P" in the present embodiment is, for example, an occupant corresponding to an AM 50 dummy doll.

First Embodiment

Figure 2:
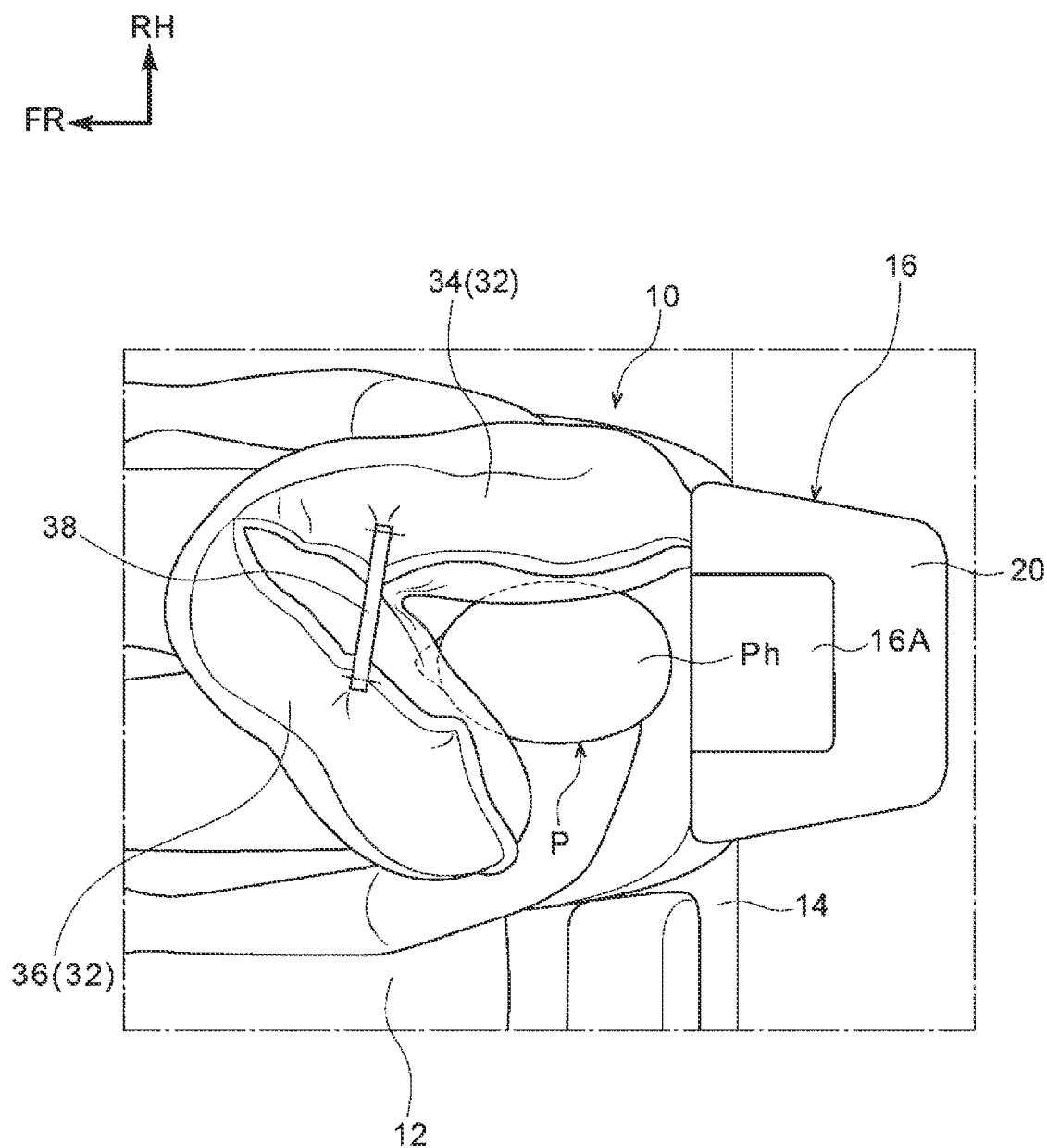
FIG. 2 is a plan view showing the seat-mounted airbag device according to the present embodiment in a deployed state.

First, the airbag device 30 according to a first embodiment will be described. As shown in FIGS. 1 and 2, the vehicle seat 10 includes a seat cushion 12 on which the occupant P sits (supports the buttocks and thighs of the occupant P), a seat back 14 that supports the back of the occupant P, and the headrest 16 that supports the head Ph of the occupant P.

The headrest 16 includes a body portion 16A having a block shape that is provided at the center of the upper end portion of the seat back 14 in the seat width direction such that the body portion 16A can move up and down. Specifically, a pair of right and left stays having a columnar shape (not shown) is provided at the center of the lower surface of the body portion 16A in the seat width direction.

Each stay is inserted in each of a pair of right and left headrest supports 26 having a substantially cylindrical shape that is provided at the center of the upper end portion of the seat back 14 in the seat width direction (see FIGS. 3 and 4) so as to move up and down and be able to be fixed at a plurality of predetermined positions. Further, the headrest 16 includes the case portion 20 continuously provided from the rear of the body portion 16A to both the right and left sides.

That is, the case portion 20 is formed in a substantially "U" shape with the front side open in a plan view. The body portion 16A is disposed on the inner side of the case portion 20 with almost no clearance. In the case portion 20, the front end surfaces (outer surface of a front wall 20F) of the right and left side portions 24 extending in a front-rear direction are substantially flush with the front surface of the body portion 16A (see FIGS. 2 and 3).

Further, right and left outer walls 20A (side portions 24) and a rear wall 20B of the case portion 20 are composed of a resin cover member 22 having a substantially "U" shape in a plan view. The upper wall (not shown), the lower wall (not shown), a front wall 20F, and an inner peripheral wall 20C facing the body portion 16A in the case portion 20 are composed of urethane foam 23, and the outer surface of the cover member 22 and the urethane foam 23 is integrally covered with a skin material 21.

A predetermined space portion S (including a housing portion 51 and a locating portion S2 to be described later) is provided inside the case portion 20. An airbag body 32 of the airbag device 30 is housed in the housing portion S1 provided in a side portion 24R of the case portion 20 on the side window 18 side (right side in the figure).

As shown in FIGS. 1 and 2, the airbag device 30 includes the airbag body 32 that is deployed forward from the rear side of the head Ph of the occupant P (specifically right rear side) seated on the vehicle seat 10 when gas is ejected from an inflator 28 (see FIGS. 3 and 4) to be described below.

The airbag body 32 includes the front-rear chamber 34 that is disposed between the side window 18 and the head Ph of the occupant P and a tip chamber 36 that is deployed inward in the seat width direction from the front end portion of the front-rear chamber 34 and is disposed forward of the face of the occupant P. Then, the airbag body 32 includes a tether 38 having a string shape that connects a predetermined position at the upper end portion of the front-rear chamber 34 and a predetermined position at the upper end of the tip chamber 36.

That is, the airbag body 32 is bent in a substantially "V" shape in a plan view to restrain at least a part of the head Ph and the chest of the occupant P. The tether 38 may be provided so as to connect at least the upper end portion of the front-rear chamber 34 and the upper end portion of the tip chamber 36, and provided, for example, so as to further connect a predetermined position at the lower end portion of the front-rear chamber 34 and a predetermined position at the lower end portion of the tip chamber 36.

Figure 3:
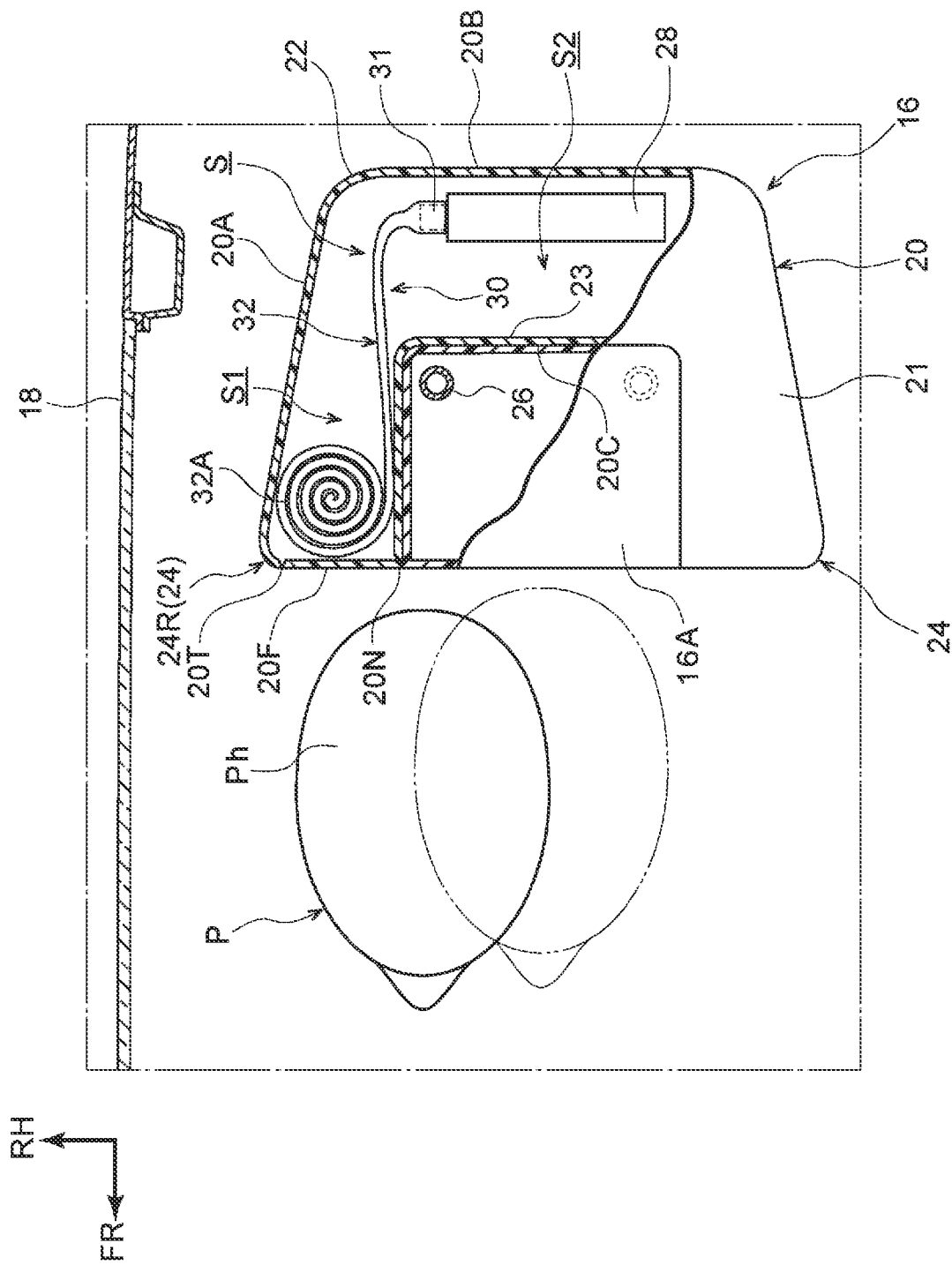
FIG. 3 is an enlarged plan view showing a state in which a seat-mounted airbag device according to a first embodiment before being deployed is partially broken.

As shown in FIG. 3, the inflator 28 is disposed in the locating portion S2 that is the rear side of the space portion S provided in the case portion 20. The inflator 28 has a substantially cylindrical shape, and the outer peripheral portion thereof is supported by a reaction force plate (not shown) having a housing shape via a retainer (not shown) such that the axial center portion thereof is disposed along the seat width direction.

The reaction force plate is fixed to, for example, a seat back frame (not shown) via a bracket (not shown), and is configured to be able to receive reaction force transmitted from the airbag body 32 deployed forward via the inflator 28. The reaction force plate and the retainer are also located in the locating portion S2.

The inflator 28 is electrically connected to an airbag electronic control unit (ECU) (not shown) provided in the vehicle, and a detection device (not shown) such as an acceleration sensor provided in the vehicle and the airbag ECU are electrically connected. Therefore, when a collision of the vehicle is detected by the detection device, the inflator 28 is operated via the airbag ECU to instantly eject the gas.

The inflator 28 may not be configured to be operated when a collision of the vehicle is detected, but may be configured to be operated when a collision of the vehicle is predicted by a collision prediction sensor or the like (not shown). Then, a connecting portion 31 (see also FIGS. 5 and 6) of the airbag body 32 is fitted and connected to the ejection port of the inflator 28.

Figure 5:
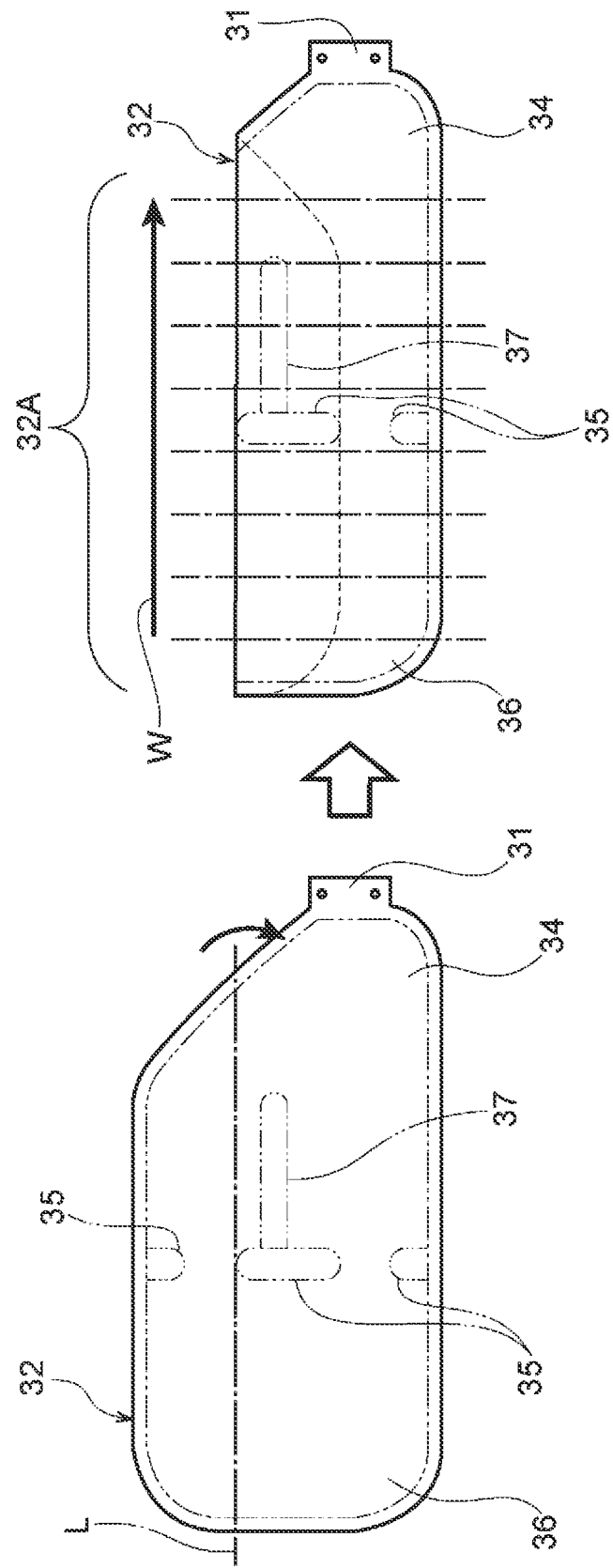
FIG. 5 is a developed view showing a method of folding an airbag body in the seat-mounted airbag device according to the first embodiment.

Further, as shown in FIG. 5, after the upper portion of the airbag body 32 (specifically, the upper portion is approximately one third of the airbag body 32 in a height direction) is folded downward along a folded line L indicated by the alternate long and short dash line, the airbag body 32 is wound outward in a roll shape in order from the tip side portion (in a direction indicated by an arrow W) with a seat up-down direction as an axial direction. That is, the airbag body 32 is housed in the housing portion S1 provided in the side portion 24R in a state where the airbag body 32 includes an outward wound portion 32A wound outward in a roll shape in the seat width direction in a plan view (see FIG. 3).

Figure 4:
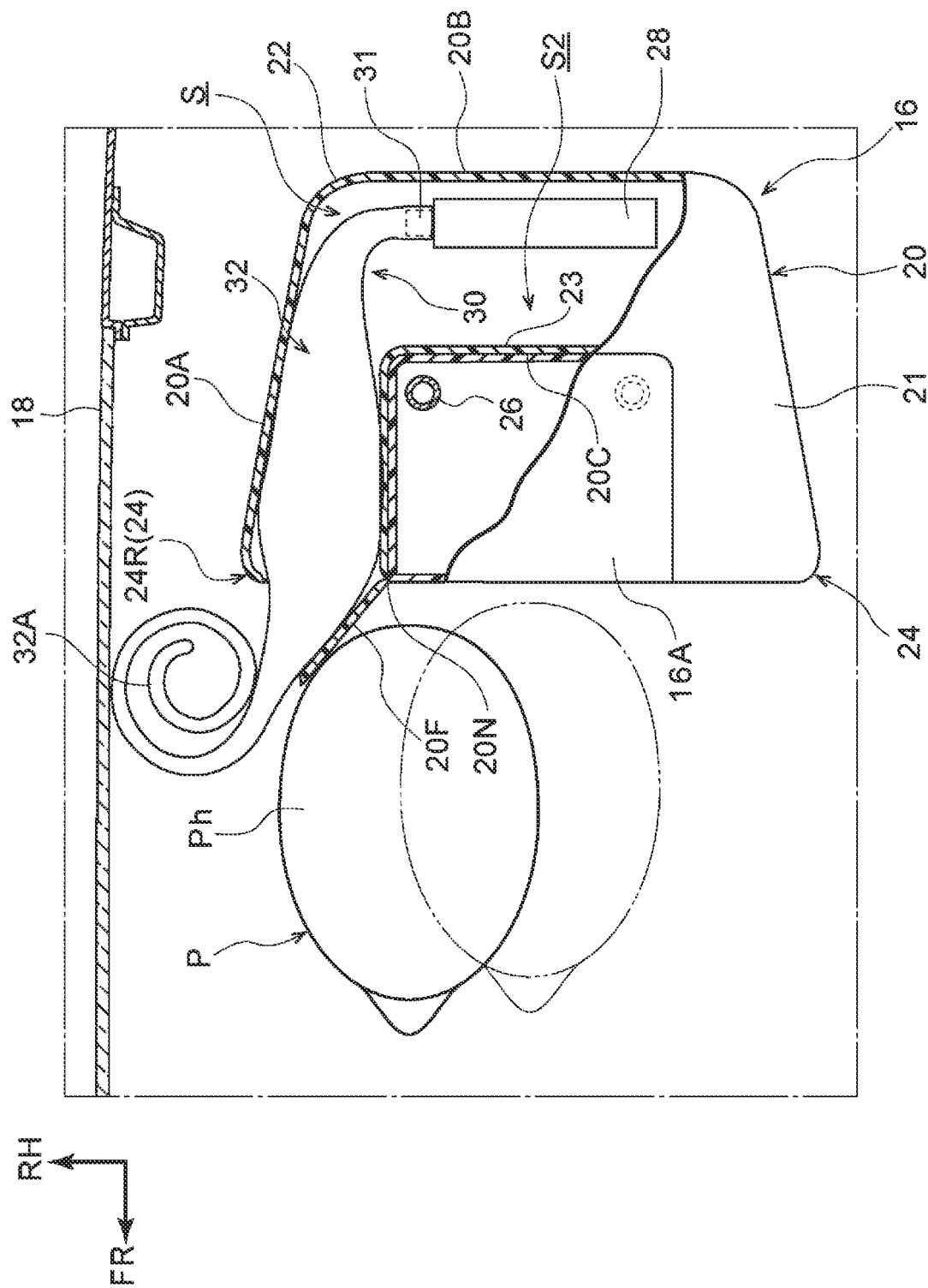
FIG. 4 is an enlarged plan view showing a state in which the seat-mounted airbag device according to the first embodiment in a deploying state is partially broken.

Therefore, as shown in FIG. 4, the airbag body 32 is deployed forward through the clearance between the side window 18 and the head Ph of the occupant P from the side portion 24R (along the side window 18) such that the outward wound portion 32A wound outward in a roll shape is unwound by the gas ejected from the inflator 28, and then the upper portion of the airbag body 32 folded downward is deployed upward.

The airbag body 32 is wound outward in a roll shape after the upper portion of the airbag body 32 is folded downward because the height of the side portion 24R (case portion 20) is lower than the height of the airbag body 32 that has been deployed. In other words, the height of the housing portion S1 is set to be a height that is slightly higher than the height of the airbag body 32 of which the upper portion is folded downward.

Further, the front wall 20F constituting the front end surface of the side portion 24R is broken, for example, linearly along the up-down direction when the airbag body 32 is deployed. The portion to be broken may be a seat width direction central portion of the front wall 20F, or a seat width direction outer end portion 20T of the front wall 20F.

When the portion to be broken is the seat width direction outer end portion 20T of the front wall 20F (for example, a fragile portion or the like that is easily broken is provided in the seat width direction outer end portion 20T of the front wall 20F), the front wall 20F is opened with a seat width direction inner end portion 20N as a hinge portion, so that the airbag body 32 to be deployed can be further suppressed from coming into contact with the head Ph of the occupant P.

Further, as shown in FIG. 5, three first non-expanding portions 35 extending in the up-down direction are provided to be sewn at predetermined intervals in the up-down direction. The first non-expanding portions 35 are provided at the substantially central portion of the airbag body 32 in the front-rear direction in a state where the airbag body 32 is not filled with the gas. A second non-expanding portion 37 extending in the front-rear direction is continuously provided to be sewn on the upstream side with respect to the first non-expanding portion 35 in a deployment direction, the first non-expanding portion 35 being located at the substantially central portion in the up-down direction.

The first non-expanding portions 35 and the second non-expanding portion 37 allow the tip chamber 36 to bend inward in the seat width direction with respect to the front-rear chamber 34, and to be deployed inward in the seat width direction. That is, in the airbag body 32, the upstream side with respect to the first non-expanding portions 35 in the deployment direction is the front-rear chamber 34, and the downstream side with respect to the first non-expanding portions 35 in the deployment direction is the tip chamber 36.

Next, the operation of the airbag device 30 according to the first embodiment having the above configuration will be described.

When the detection device detects that a frontal collision has occurred, the inflator 28 is operated and instantly ejects gas into the airbag body 32. When the gas is ejected into the airbag body 32, the front wall 20F of the side portion 24R is broken by deployment of the airbag body 32 (by being pressed by the airbag body 32 from the inside). Then, the airbag body 32 is deployed forward through the clearance between the side window 18 and the head Ph of the occupant P from the side portion 24R.

That is, the airbag body 32 is deployed along the side window 18 while the outward wound portion 32A wound outward in a roll shape is unwound. Therefore, at the time of deployment, even when the head Ph of the occupant P is closer to the side window 18 side, as shown by solid lines in FIGS. 3 and 4 for example, from the position indicated by long dashed double-short dashed lines, and the clearance between the side window 18 and the head Ph of the occupant P is narrow, the airbag body 32 can be easily and smoothly deployed along the side window 18.

After the outward wound portion 32A is unwound, the upper portion of the airbag body 32, which is folded downward, is deployed upward. Then, at least a part of the head Ph and the chest of the occupant P seated on the vehicle seat 10 is restrained by the fully deployed airbag body 32 (front-rear chamber 34 and tip chamber 36). Therefore, it is possible to suppress movement of at least the part of the head Ph and the chest of the occupant P forward due to the inertial force by the airbag body 32 (front-rear chamber 34 and tip chamber 36).

Further, as described above, since the airbag body 32 is deployed forward while the outward wound portion 32A wound outward is unwound, there is no possibility that the face of the occupant P will be hurt by the airbag body 32 when the airbag body 32 is deployed. Moreover, when the front wall 20F is configured to be opened with the seat width direction inner end portion 20N as the hinge portion at the time of deployment of the airbag body 32, the airbag body 32 to be deployed can be further suppressed from coming into contact with the head Ph of the occupant P by the front wall 20F.

Further, as described above, the airbag body 32 is wound outward in a roll shape after the upper portion thereof is folded downward (the outward wound portion 32A is provided). Therefore, when the airbag body 32 is deployed forward through the clearance between the side window 18 and the head Ph of the occupant P from the side portion 24R by the gas ejected from the inflator 28, the outward wound portion 32A wound outward in a roll shape is first deployed while being unwound, and then the upper portion of the airbag body 32, which is folded downward, is deployed upward.

Therefore, the airbag body 32 wound outward in a roll shape (including the outward wound portion 32A) after the upper portion of the airbag body 32 is folded downward can be deployed forward more quickly than the airbag body 32 of which the upper portion is folded downward after the airbag body 32 is wound outward in a roll shape (after an outward wound portion 32B to be described below is provided).

Modification of Method of Folding Airbag Body

Figure 6:
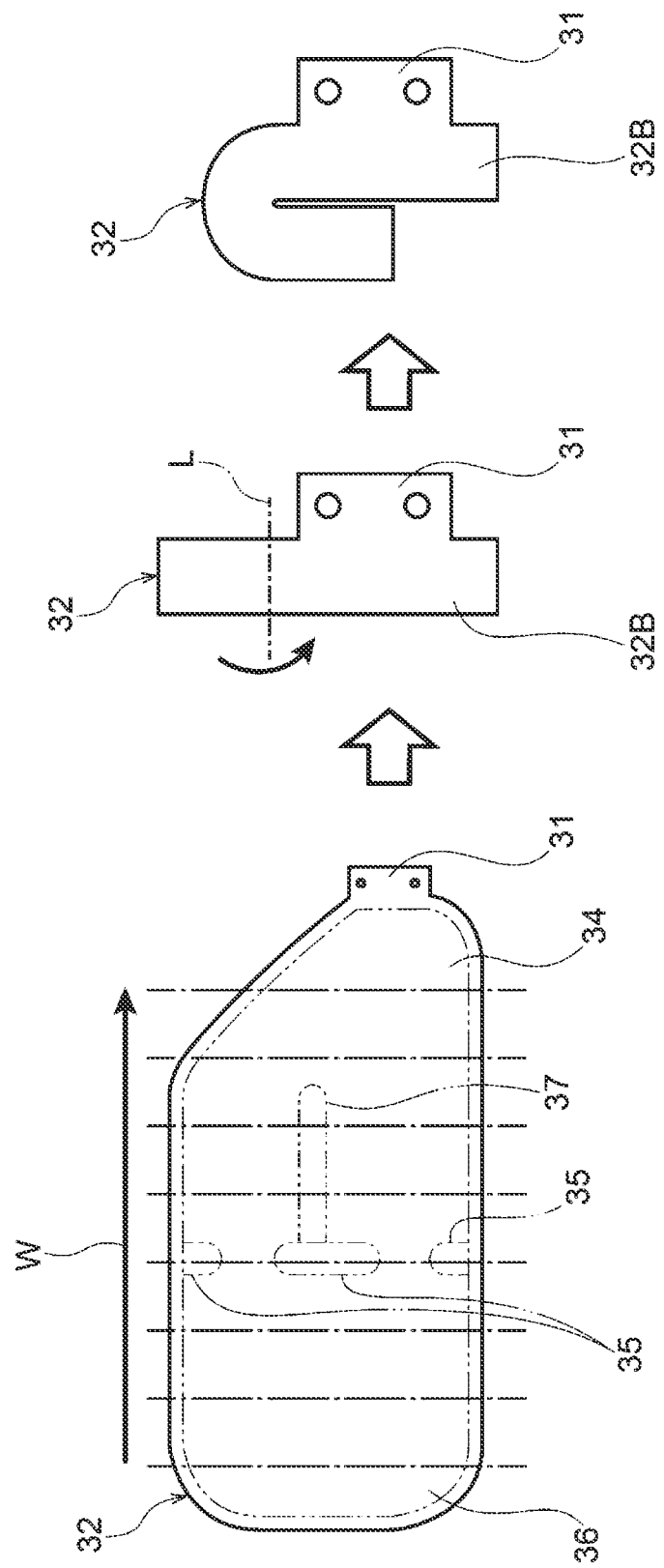
FIG. 6 is a developed view showing a modification of a method of folding an airbag body in the seat-mounted airbag device according to the first embodiment.

A method of folding the airbag body 32 is not limited to the method of folding the airbag body 32 shown in FIG. 5. For example, as shown in FIG. 6, after the outward wound portion 32B is provided by being wound outward in a roll shape in order from the tip side portion (in a direction indicated by an arrow W) with the seat up-down direction as the axial direction, the upper portion of the airbag body 32 may be folded downward along a folded line L indicated by the alternate long and short dash line.

In this case, when the airbag body 32 is deployed forward through the clearance between the side window 18 and the head Ph of the occupant P from the side portion 24R by the gas ejected from the inflator 28, the upper portion of the airbag body 32, which is folded downward, is first deployed upward, and then the outward wound portion 32B wound outward in a roll shape is deployed forward while being unwound.

Therefore, the airbag body 32 of which the upper portion is folded downward after the airbag body 32 is wound outward in a roll shape (after the outward wound portion 32B is provided) can easily pass through the clearance between the side window 18 and the head Ph of the occupant P even when the clearance is narrow as compared with the airbag body 32 wound outward in a roll shape (including the outward wound portion 32A) after the upper portion of the airbag body 32 is folded downward.

In other words, according to the airbag body 32 of which the upper portion is folded downward after the airbag body 32 is wound outward in a roll shape (after the outward wound portion 32B is provided), it is possible to further suppress or prevent the occurrence of deployment failure caused by the narrow clearance between the side window 18 and the head Ph of the occupant P.

Second Embodiment

Next, the airbag device 30 according to a second embodiment will be described. The same parts as those in the first embodiment are designated by the same reference signs, and detailed description thereof (including common operations) will be omitted as appropriate.

Figure 7:
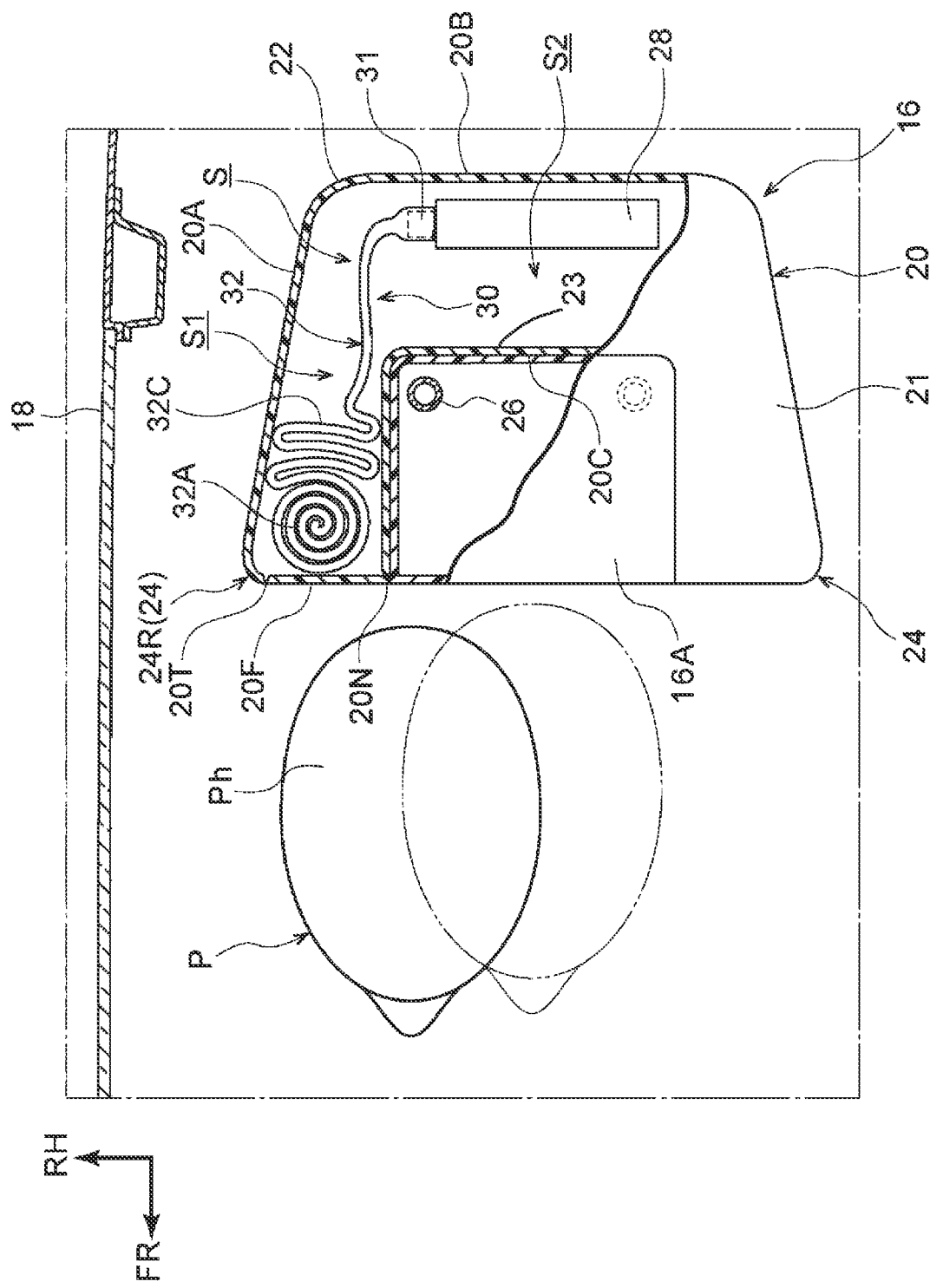
FIG. 7 is an enlarged plan view showing a state in which a seat-mounted airbag device according to a second embodiment before being deployed is partially broken.

As shown in FIG. 7, the airbag body 32 of the airbag device 30 according to the second embodiment is different from the first embodiment only in that a bellows portion 32C continuously formed on the upstream side with respect to the outward wound portion 32A in the deployment direction is provided as well as the outward wound portion 32A.

That is, the airbag body 32 is housed in the housing portion S1 in a state where the airbag body 32 includes the bellows portion 32C continuously folded in a bellows shape on the upstream side with respect to the outward wound portion 32A in the deployment direction. Only two sets of the bellows portion 32C shown in the figure are provided when the part folded in half is set as one set, but the present disclosure is not limited to this, and three or more sets of the bellows portion 32C may be provided.

As described above, in a case where the outward wound portion 32A and the bellows portion 32C are provided in the airbag body 32 in order from the downstream side in the deployment direction, the bellows portion 32C is first deployed while being unwound, and then the outward wound portion 32A is deployed while being unwound when the airbag body 32 is deployed forward through the clearance between the side window 18 and the head Ph of the occupant P from the side portion 24R by the gas ejected from the inflator 28.

Here, it is generally known that the airbag body having a bellows shape can be unwound more quickly than the airbag body having a roll shape (resistance of the airbag body having a bellows shape is smaller than that of the airbag body having a roll shape when the airbag body is deployed). Therefore, the airbag body 32 including the outward wound portion 32A and the bellows portion 32C in order from the downstream side in the deployment direction can be deployed forward quickly as compared with a case where the airbag body 32 housed in the housing portion S1 includes only the outward wound portion 32A.

However, when the airbag body 32 includes only the outward wound portion 32A, the airbag body 32 can be housed in the housing portion S1 more easily than when the airbag body 32 includes the outward wound portion 32A and the bellows portion 32C since only the outward wound portion 32A is provided. That is, when the airbag body 32 includes only the outward wound portion 32A, it is easy to manufacture the airbag body 32 in a state where the airbag body 32 is housed in the housing portion S1.

Further, the airbag body 32 of the airbag device 30 according to the second embodiment may be provided with the outward wound portion 32B shown in FIG. 6 instead of the outward wound portion 32A. That is, the method shown in FIG. 5 or the method shown in FIG. 6 may be adopted for the method of folding the airbag body 32 on the downstream side with respect to the bellows portion 32C in the deployment direction.

The seat-mounted airbag device 30 according to the present embodiment has been described above with reference to the drawings, but the seat-mounted airbag device 30 according to the present embodiment is not limited to the illustrated embodiments and its design can be changed as appropriate within the scope of the present disclosure. For example, the reaction force plate that supports the inflator 28 may be fixed via a bracket to the headrest support 26 instead of the seat back frame.

What is claimed is:

1. A seat-mounted airbag device comprising:
an inflator that is operated when a vehicle collision is detected or predicted and ejects gas; and
an airbag body configured to be deployed forward of a seat through a clearance between a window and a head of an occupant from a side portion of a headrest on a window side by the gas ejected from the inflator, and the airbag body including a front-rear chamber configured to be disposed between the window and the head of the occupant and a tip chamber that is deployed inward in a seat width direction from an end portion of the front-rear chamber on a seat front side and configured to be disposed forward of a face of the occupant on the seat front side, wherein the airbag body is bent in a V-shape in a plan view when deployed, and wherein the airbag body housed in the side portion includes an outward wound portion wound outward in a roll shape with a seat up-down direction as an axial direction.

2. The seat-mounted airbag device according to claim 1, wherein the airbag body housed in the side portion includes a bellows portion continuously folded in a bellows shape on an upstream side with respect to the outward wound portion in a deployment direction.

3. The seat-mounted airbag device according to claim 1, wherein in the airbag body housed in the side portion, the outward wound portion is provided after an upper portion of the airbag body is folded downward.

4. The seat-mounted airbag device according to claim 1, wherein in the airbag body housed in the side portion, an upper portion of the airbag body is folded downward after the outward wound portion is provided.

* * * * *